Patented Feb. 22, 1927.

1,618,504

UNITED STATES PATENT OFFICE.

GEORGE BARSKY, OF NEW YORK, N. Y., ASSIGNOR TO AMERICAN CYANAMID COMPANY, OF NEW YORK, N. Y., A CORPORATION OF MAINE.

PROCESS OF MAKING DICYANDIAMID.

No Drawing. Application filed June 9, 1923. Serial No. 644,501.

This invention relates to a process of polymerizing certain types of organic compounds in such a manner that a maximum yield of the desired product will be obtained, and the formation of objectionable by-products will be reduced to a minimum. The discovery is illustrated and particularly pointed out in the production of dicyandiamid from calcium cyanamid in a continuous operation, and at the same time eliminating the common and objectionable side reactions which lead to the formation of ammonia, urea, melamine, etc., at the expense of either the calcium cyanamide, the dicyandiamid, or both. It also relates to the discovery broadly of a commercial method of selectively producing and recovering a pure material when the reaction would normally yield a complex mixture. It also affords a method of controlling the addition of reagents so that at all times the desired chemical equilibria will be maintained, and the reaction will progress in the desired direction.

The object of the invention is to provide a method that will be simple in its nature, comparatively easy to carry out and less costly to operate than those heretofore proposed. With these and other objects in view the invention consists in the novel steps and combinations of steps constituting the process, all as will be more fully hereinafter disclosed and particularly pointed out in the claims.

In practicing my invention I may take 325 pounds of calcium cyanamid which is added to about 975 pounds of water in a vessel provided with a stirring apparatus and means for controlling the temperature thereof. The addition is made in such a manner as to avoid local heating of the solution due to the heat of solution, and the temperature is kept below about 30° C. to 35° C. by stirring, cooling coils or in any other manner. When solution is substantially complete (about 90% of the calcium cyanamid in solution) it is filtered to remove insoluble material.

The resulting solution of calcium acid cyanamid is then treated with a 10% solution of sulphuric acid until it is just acid to thymolphthalein indicator ($pH^+$ 9.6) keeping the temperature below 50° C. after which the solution is filtered giving a solution of free cyanamid. The temperature is adjusted to about 50° C., and is maintained at this point until conversion into dicyandiamid is substantially complete. During the reaction the acidity of the solution decreases making it necessary to add, from time to time, further quantities of sulphuric acid to the solution, which is preferably cooled and agitated to keep the temperature thereof from rising too high. Sufficient sulphuric acid is then added to make the solution slightly acid to methyl red ($pH^+$ 5.0) to prevent decomposition of the diacyandiamid and the solution is filtered, if necessary, after which it is evaporated at about 50° C. until it begins to crystallize. The solution is cooled and filtered to recover the crystals of dicyandiamid and the mother liquor may be reworked, all as is well known in the art of evaporation.

Although in the above illustration I have referred particularly to the employment of sulphuric acid, I do not wish to be confined to the use of this acid as many others may be sucessfully substituted. I also do not wish to confine myself to the use of an acid at all as any material capable of maintaining a correct hydrogen ion concentration in any manner whatsoever will accomplish the results. As an illustration of a method of this nature, I may add a so-called buffer, such as a mixture of boric acid and sodium borate or I may use a buffer and an acid at the same time.

The preliminary treatment of the material may be varied to suit the conditions and to reduce the cost to a minimum. For example, I have described a method in which the crude calcium cyanamid or lime nitrogen is treated with about three parts of water, filtered and washed until approximately 90% of the calcium cyanamid is dissolved and after the preliminary addition of acid the precipitate is again removed by filtration. But I have discovered that these filtrations may be dispensed with, and that the acid may be added to the water or to the lime nitrogen mixture, under the proper control as before, until the cyanamid disappears. The solids may then be removed by filtration or decantation to permit of the recovery of the dicyandiamid by evaporation of the resulting filtrate.

It has been proposed to prepare dicyandiamid by extracting calcium cyanamid with water and treating the extract with acid in such a way that the ratio of calcium to cyanamid present is a constant during the reaction. It has also been proposed to use heavy metal cyanamids as catalysts in the preparation of dicyandiamid from cyanamid. I have found that these processes either do not give good yields, or are so cumbersome in operation or difficult to carry out that it is unprofitable to employ them for the production of dicyandiamid.

In the production of dicyandiamid from cyanamid, other reactions may take place, both forming undesirable compounds and reducing the yield. These reactions include the formation of ammonia, urea, melamine, and the decomposition of the dicyandiamid formed.

I have investigated the reactions taking place in solutions of cyanamid under various conditions and have found:

1—That the reaction whereby dicyandiamid is formed from cyanamid has an appreciable velocity at hydrogen ion concentrations between $10^{-8.5}$ normal and $10^{-12.5}$ normal at temperatures between 30° C. and 90° C.

2—That at any definite hydrogen ion concentration within these limits the reaction is a typical reaction of the second order; that is at any instant during the course of the reaction the rate of cyanamid polymerization is proportional to the square of the cyanamid concentration existing at that instant.

3—That the velocity of the reaction at any period varies with the hydrogen ion concentration at that period, being a maximum at essentially $10^{-9.6}$ normal.

4—That at a temperature of 80° C. the decomposition of the dicyandiamid takes place at an appreciable rate when the hydrogen ion concentration is at and below $10^{-9.0}$ normal and that the lower the hydrogen ion concentration the greater is the rate of decomposition.

5—That the destruction of dicyandiamid at temperatures above 80° C. becomes appreciable when hydrogen ion concentrations are greater than $10^{-9.0}$ normal.

6—That the effect of a rise of temperature is to increase the rate of polymerization essentially in accordance with the general rule that a 10 degree rise doubles the velocity of the reaction.

In a solution of cyanamid having a hydrogen ion concentration such that dicyandiamid is formed, the formation of dicyandiamid is accompanied by a decrease in the hydrogen ion concentration of the solution. This follows from the fact that cyanamid is a stronger acid than the dicyandiamid formed from it. This decrease in hydrogen ion concentration is further augmented by the fact that two molecules of cyanamid each containing two potential hydrogen ions, polymerize to form one molecule of dicyandiamid containing one potential hydrogen ion. Consequently, the hydrogen ion concentration of a solution of cyanamid in which the formation of dicyandiamid is taking place is constantly changing. As a result of this change I have found that the rate of formation of dicyandiamid as well as the rate of other reactions involving cyanamid together with the rate of other reactions involving dicyandiamid are affected. It follows, therefore, that by controlling the hydrogen ion concentration of the reacting solution, I can so control the reaction as to secure the maximum formation of dicyandiamid. Further, I find that by causing the reaction to take place under conditions of high velocity I can largely avoid the formation of other cyanamid derivatives; and since I can obtain a high reaction velocity without the range of dicyandiamid destruction, I can also secure high yields of dicyandiamid.

In the treatment of cyanamid I do not confine myself to the use of any particular salt or solution of the same. My process applies to any solution however prepared. Nor do I confine myself to any particular acid, as any acid or other substance capable of bringing about and maintaining the correct degree of hydrogen ion concentration for the purpose in hand may be employed.

The essential feature of my invention is the maintenance and control of the hydrogen ion concentration, and the temperature at a point that will best suit the purpose in hand. If a maximum yield is the object sought, then said concentration and temperature will be so chosen that the reaction will yield a maximum amount of the material desired with a minimum decomposition of the same and the formation of a minimum of objectionable by-products.

If it is desired at any time to retard the reaction or to cause a complete cessation for a certain period, it may be brought about by changing the hydrogen ion concentration to a point ($p$H$^+$ 5.0) at which the velocity of formation of dicyandiamid is practically nil. To again start the reaction it is simply necessary to bring the hydrogen ion concentration back to the proper point ($p$H$^+$ 9.6). By this means one may practically stop the reaction at the close of the day and start it up the next morning.

It is obvious that those skilled in the art may vary the details of the process as well as the method of controlling it without departing from the spirit of the invention, and therefore I do not wish to be limited to the above disclosure except as may be required by the claims.

What I claim is:

1. A method of controlling the transformation of calcium cyanamid into dicyandiamid which comprises mixing lime nitrogen with sufficient water to dissolve the calcium cyanamid; adding dilute sulphuric acid until the hydrogen ion concentration substantially reaches $10^{-9.6}$ normal; and gradually adding further amounts of acid to maintain this hydrogen ion concentration until a substantial portion of the cyanamid disappears, substantially as described.

2. A method of controlling the transformation of calcium cyanamid into dicyandiamid which comprises mixing lime nitrogen with sufficient water to dissolve the calcium cyanamid; adding dilute sulphuric acid until the hydrogen ion concentration substantially reaches $10^{-9.6}$ normal; gradually adding further amounts of acid to maintain this hydrogen ion concentration until a substantial portion of the cyanamid disappears; adding further amounts of the acid until the hydrogen ion concentration substantially reaches $10^{-5.0}$ normal; evaporating the solution; and recovering the dicyandiamid, substantially as described.

3. A method of effecting the transformation of calcium cyanamid into dicyandiamid which comprises treating lime nitrogen with sufficient water to dissolve out approximately 90% of the cyanamid; filtering and adding to the filtrate an amount of sulphuric acid sufficient to bring the hydrogen ion concentration to substantially $10^{-9.6}$ normal; filtering off the solids; adding to the filtrate further sulphuric acid at a rate sufficient to substantially maintain this said hydrogen ion concentration until a material proportion of the cyanamid present disappears; adding acid until the hydrogen ion concentration reaches substantially $10^{-5.0}$ normal; and evaporating the solution preparatory to obtaining the desired dicyandiamid, substantially as described.

4. A method of controlling the transformation of a solution of cyanamid into dicyandiamid which comprises determining from time to time the degree of hydrogen ion concentration; agitating the solution; adding dilute sulphuric acid to the agitated solution; maintaining said solution at a temperature of approximately 35° C. until the hydrogen ion concentration reaches substantially $10^{-9.6}$ normal; filtering off the solids; continuing the addition of the acid while maintaining substantially the same hydrogen ion concentration; maintaining said solution at a temperature of substantially 50° C. until the cyanamid disappears; and recovering the dicyandiamid through evaporation of the solution, substantially as described.

5. A method of controlling the transformation of a solution of cyanamid into dicyandiamid which comprises maintaining a hydrogen ion concentration between $10^{-12.5}$ and $10^{-8.5}$ normal until a substantial amount of dicyandiamid is formed.

6. A method of controlling the transformation of a solution of cyanamid into dicyandiamid which comprises maintaining a hydrogen ion concentration between $10^{-12.5}$ and $10^{-8.5}$ normal and a temperature between 30° and 90° C. until a substantial amount of dicyandiamid is formed.

7. A method of controlling the transformation of a soultion of cyanamid into dicyandiamid which comprises maintaining a hydrogen ion concentration between $10^{-12.5}$ and $10^{-8.5}$ normal and a temperature between 30° and 90° C. until a substantial amount of dicyandiamid is formed and recovering the same.

8. A method of controlling the transformation of a solution of cyanamid into dicyandiamid which comprises maintaining a hydrogen ion concentration of about $10^{-9.6}$ normal and a temperature of about 50° C. until a substantial amount of dicyandiamid is formed.

9. A method of controlling the transformation of a solution of cyanamid into dicyandiamid which comprises maintaining a hydrogen ion concentration of about $10^{-9.6}$ normal and a temperature of about 50° C. until a substantial amount of dicyandiamid is formed and recovering the same.

10. A method of controlling the transformation of cyanamid into dicyandiamid which comprises maintaining a suitable hydrogen ion concentration to form dicyandiamond, increasing the hydrogen ion concentration to prevent decomposition thereof and evaporating the solution to recover the same.

In testimony whereof I affix my signature.

GEORGE BARSKY.